United States Patent
Yang (10) Patent No.: US 10,152,164 B2
(45) Date of Patent: Dec. 11, 2018

(54) TOUCH DRIVING CIRCUIT, TOUCH DRIVING METHOD AND TOUCH SCREEN

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventor: Yizhi Yang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 407 days.

(21) Appl. No.: 15/073,646

(22) Filed: Mar. 18, 2016

(65) Prior Publication Data

US 2017/0003797 A1  Jan. 5, 2017

(30) Foreign Application Priority Data

Jun. 30, 2015  (CN) .......................... 2015 1 0375177

(51) Int. Cl.
 *G06F 3/041* (2006.01)
 *G06F 3/044* (2006.01)
(52) U.S. Cl.
 CPC .......... *G06F 3/0416* (2013.01); *G06F 3/0412* (2013.01); *G06F 3/044* (2013.01)
(58) Field of Classification Search
 CPC ...... G06F 3/0412; G06F 3/044; G06F 3/0416; G06F 2310/0286
 See application file for complete search history.

(56) References Cited

U.S. PATENT DOCUMENTS

| | | | |
|---|---|---|---|
| 9,785,280 B2 * | 10/2017 | Pang ..................... | G06F 3/0416 |
| 2013/0293491 A1 | 11/2013 | Doi et al. | |
| 2014/0048854 A1 * | 2/2014 | Wang .................... | G06F 3/0412 |
| | | | 257/254 |

(Continued)

FOREIGN PATENT DOCUMENTS

| | | |
|---|---|---|
| CN | 103294295 A | 9/2013 |
| CN | 103383511 A | 11/2013 |
| CN | 104049790 A | 9/2014 |

*Primary Examiner* — Kumar Patel
*Assistant Examiner* — Amy C Onyekaba
(74) *Attorney, Agent, or Firm* — Kilpatrick Townsend & Stockton LLP (57) ABSTRACT

A touch screen, a touch driving circuit and a touch driving method are provided in the disclosure. The touch driving circuit includes multiple cascading shifting registers and selection outputting circuits each connected to a respective shifting register. At least one of the selection outputting circuits is connected to multiple touch electrodes; each of the touch electrodes is connected to one of the selection outputting circuits; and when the shifting register is being scanned and the selection outputting circuit connected to the shifting register is connected to multiple touch electrodes, the selection outputting circuit provides touch driving signals with different frequencies for the touch electrodes connected to the selection outputting circuit simultaneously. The touch driving circuit can simultaneously drive multiple touch electrodes to perform touch detections, thus improving the efficiency of the touch detection.

18 Claims, 5 Drawing Sheets

(56) References Cited

U.S. PATENT DOCUMENTS

| | | | |
|---|---|---|---|
| 2014/0232690 A1 | 8/2014 | Huang | |
| 2014/0253498 A1* | 9/2014 | Suzuki | G06F 3/044 345/174 |
| 2015/0009174 A1* | 1/2015 | Huang | G06F 3/044 345/174 |
| 2015/0277651 A1* | 10/2015 | Zhang | G06F 3/041 345/173 |
| 2015/0355765 A1* | 12/2015 | Fukushima | G06F 3/0412 345/174 |
| 2016/0300523 A1* | 10/2016 | Tan | G06F 3/0412 |
| 2016/0334908 A1* | 11/2016 | Zhuang | G06F 3/0412 |
| 2017/0186773 A1* | 6/2017 | Fan | H01L 27/124 |

\* cited by examiner

TOUCH DRIVING CIRCUIT, TOUCH DRIVING METHOD AND TOUCH SCREEN

CROSS REFERENCE TO RELATED APPLICATIONS

The present application claims the priority of Chinese Patent Application No. 201510375177.4, titled "TOUCH DRIVING CIRCUIT, TOUCH DRIVING METHOD AND TOUCH SCREEN", filed on Jun. 30, 2015 with the State Intellectual Property Office of People's Republic of China, which is incorporated herein by reference in its entirety.

FIELD

The disclosure relates to the field of touch technology, particularly to a touch driving circuit, a touch driving method and a touch screen.

BACKGROUND

With the development of science and technology, various touch electronic devices are increasingly applied in people's work and daily lives, which brings great convenience to people's work and daily lives.

A touch screen is a main component of the touch electronic device, and the touch electronic device achieves a touch operation and image display through the touch screen. A touch driving circuit, configured to perform touch driving and display driving, is an important structure of the touch screen in achieving touch driving and display driving.

A conventional touch driving circuit is only capable of driving touch electrodes one by one to perform touch detections, thus the efficiency of the touch driving is low.

SUMMARY

To solve the problem above, a touch driving circuit, a touch driving method and a touch screen are provided according to the disclosure, with which the efficiency of the touch driving is improved.

In order to fulfill the purpose above, the following technical solutions are provided according to the disclosure.

A touch driving circuit is provided, which includes multiple cascading shifting registers; and selection outputting circuits. Each outputting circuits is connected to a respective shifting register. At least one of the selection outputting circuits is connected to multiple touch electrodes. Each of the touch electrodes is connected to one of the selection outputting circuits. When the shifting register is being scanned, the selection outputting circuit connected to the shifting register simultaneously provides touch driving signals with different frequencies for the multiple touch electrodes connected to the selection outputting circuit.

A touch driving method, applied to the touch driving circuit, is further provided according to the disclosure. The method includes providing, by each selection outputting circuit of a touch driving circuit, a touch driving signal for a touch electrode connected to the selection outputting circuit, to drive the touch electrodes to perform touch detection when a respective shifting register connected to the selection outputting circuit is being scanned. By this method, at least one selection outputting circuit is connected to multiple touch electrodes, and provides touch driving signals with different frequencies for the multiple touch electrodes. A touch screen is further provided according to the disclosure, and the touch screen includes the touch driving circuit or use the touch driving method.

BRIEF DESCRIPTION OF THE DRAWINGS

To describe the technical solutions for the embodiments of the present disclosure more clearly, the following briefly describes the drawings involved in the embodiments of the present disclosure or in the conventional technology. Apparently, the drawings described below are some embodiments, and persons of ordinary skill in the art can derive other drawings according to the drawings without any creative effort.

DETAILED DESCRIPTION

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

Figure 1:
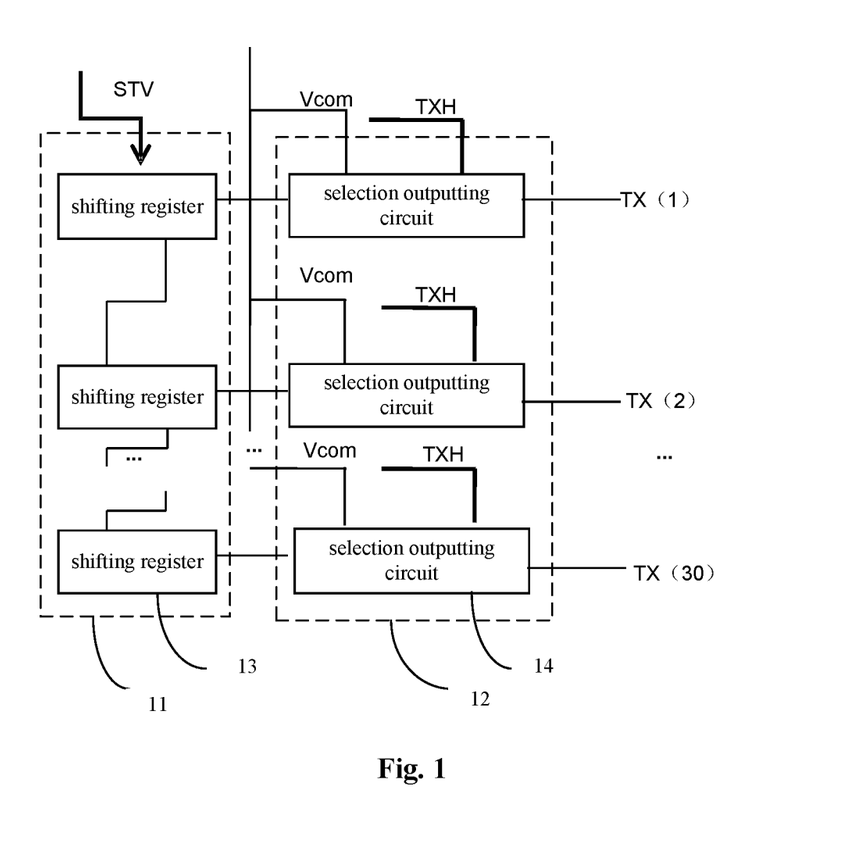
FIG. 1 is a structural diagram of a conventional touch driving circuit.

FIG. 1 is a structural diagram of a conventional touch driving circuit, and the touch driving circuit includes a scan circuit 11 and an output circuit 12. The scan circuit 11 includes multiple cascading shifting registers 13. The output circuit 12 includes multiple selection outputting circuits 14, where each of the selection outputting circuits 14 is connected to a respective shifting register 13.

In conventional technology, a selection outputting circuit 14 is connected to a respective touch electrode, and the touch driving circuit drives touch electrodes one by one to perform touch detections. Taking the touch driving circuit for driving 30 touch electrodes as an example, as shown in FIG. 1, the driving circuit includes thirty cascading shifting registers 13 and thirty selection outputting circuits 14. A common voltage signal Vcom and a touch driving signal THX are input into each of the selection outputting circuits 14, and the common voltage signal Vcom and the touch driving signal THX are provided to a corresponding touch electrode under the control of a corresponding shifting register 13. A scan initiating signal STV is input into the first-stage shifting register, and the shifting registers are scanned stage by stage until the thirty-stage shifting register is scanned. In a case that the shifting registers are being scanned, the selection outputting circuits output touch driving signals in sequence, that is, the first-stage selection outputting circuit provides a touch driving signal for touch electrode TX1, the second-stage selection outputting circuit provides a touch driving signal for touch electrode TX2, . . .

., and the thirty-stage selection outputting circuit provides a touch driving signal for touch electrode TX30. In the conventional technology, the touch driving for the touch electrodes can be achieved, however, only one touch electrode can be driven to perform touch detection by scanning one shifting register, thus the efficiency of the touch detection is low.

Figure 2:
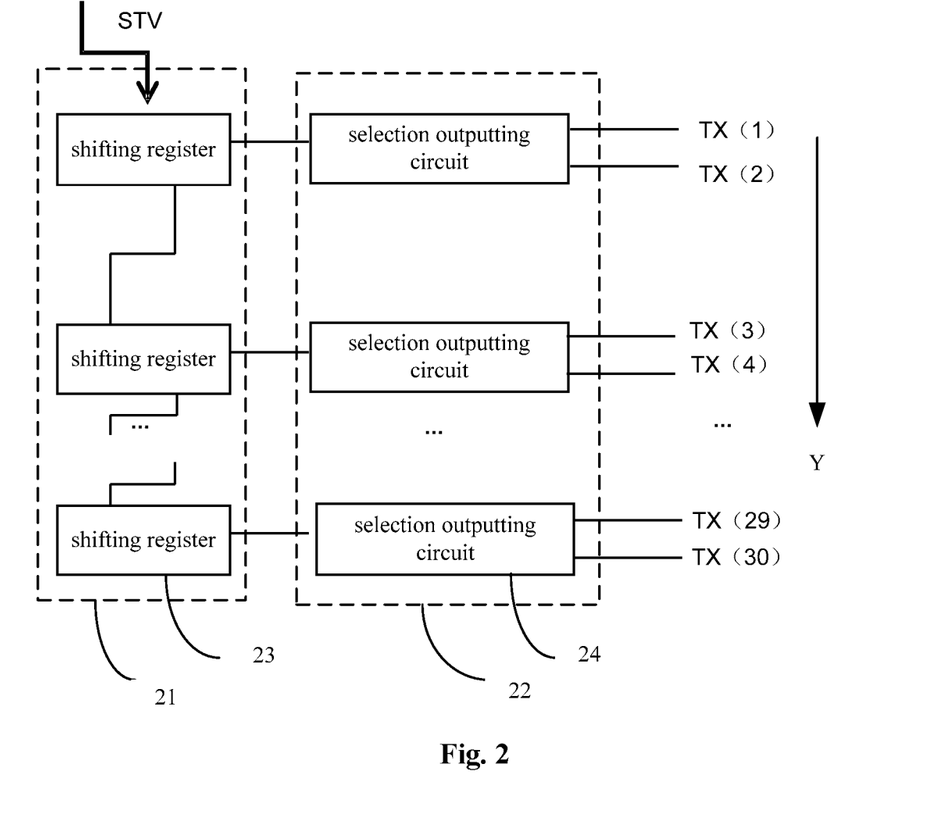
FIG. 2 is a structural diagram of a touch driving circuit according to an embodiment of the disclosure.

In order to solve the above problem, a touch driving circuit is provided according to the disclosure. FIG. 2 is a structural diagram of a touch driving circuit according to an embodiment. In this embodiment, the touch driving circuit includes a scan circuit 21 and an output circuit 22. The scan circuit 21 includes multiple cascading shifting registers 23, and the output circuit 22 includes multiple selection outputting circuits 24 each connected to a respective shifting register 23. The scan circuit 21 may be a conventional gate driving circuit.

In the touch driving circuit according to the embodiment, at least one of the selection outputting circuits 24 is connected to multiple touch electrodes, each of the touch electrodes is connected to one of the selection outputting circuits 24, and when the shifting register 23 is being scanned, and the selection outputting circuit 24 connected to the shifting register 23 is connected to multiple touch electrodes, the selection outputting circuit 24 simultaneously provides touch driving signals with different frequencies to the multiple touch electrodes connected to the selection outputting circuit 24.

In a case that the selection outputting circuit 24 is connected to multiple touch electrodes, touch detections may be performed simultaneously on multiple touch electrodes connected to the selection outputting circuit 24 by providing touch driving signals with different frequencies for the multiple touch electrodes connected to the selection outputting circuit 24.

In the touch driving circuit as shown in FIG. 2, each selection outputting circuit 24 is connected to two touch electrodes to drive 30 touch electrodes. This is illustrated as an example. The thirty touch electrodes are, touch electrode TX(1), touch electrode TX(2), touch electrode TX(3), touch electrode TX(4), . . . , touch electrode TX(29) and touch electrode TX(30) along a first direction Y. The number of touch electrodes is related to the dimension and touch precision of the touch screen. In this embodiment, only driving 30 touch electrodes is taken as an example, and the number of the touch electrodes may be arbitrary.

In this embodiment, each selection outputting circuit 24 provides a common voltage to a respective touch electrode connected to the selection outputting circuit when the shifting registers are not scanned. The common voltage is also used as a sustaining voltage for the touch electrodes when the touch detection is not performed on the touch electrodes, without providing a sustaining voltage separately.

In this embodiment, when the shifting register is being scanned, the shifting register may be referred to as being in an on-state and outputs a high-level signal. When the shifting register is not scanned, the shifting register may be referred to as being in an off-state and outputs a low-level signal.

In the embodiment of the disclosure, it may be arranged that each of the selection outputting circuits 24 is connected to two touch electrodes. The two touch electrodes connected to any one of the selection outputting circuits 24 are defined as a first touch electrode and a second touch electrode. The touch driving signal corresponding to the first touch electrode has a different frequency from the touch driving signal corresponding to the second touch electrode. Touch driving signals are simultaneously provided for multiple touch electrodes connected to a same selection outputting circuit 24, and to distinguish touch operations of the multiple touch electrodes, frequencies of the touch driving signals input into the multiple touch electrodes are set to be different, to achieve simultaneous touch detections.

Touch driving signals with different frequencies are input into the first touch electrode and the second touch electrode connected to the same selection outputting circuit respectively, thus enabling the two touch electrodes to perform touch detections simultaneously. If each selection outputting circuit is connected to two touch electrodes, the touch driving time is halved and the efficiency for the touch detection can be improved, while number of stages is reduced, the structure of the circuit is simplified, and cost is reduced.

Optionally, it is set that two electrodes connected to a same selection outputting circuit are the first touch electrode and the second touch electrode along the first direction Y. For example, the touch electrode TX(1) and the touch electrode TX(2) connected to the first selection outputting circuit are the first touch electrode and the second touch electrode respectively; the touch electrode TX(3) and the touch electrode TX(4) connected to the second selection outputting circuit are the first touch electrode and the second touch electrode respectively, and the touch electrode TX(2n−1) and the touch electrode TX(2n) connected to the n selection outputting circuit are the first touch electrode and the second touch electrode respectively, where n is a positive integer. It may be set that touch driving signals with a same frequency are input into the first touch electrodes of all selection outputting circuit 24, and touch driving signals with a same frequency are input into the second touch electrodes of all selection outputting circuit 24, so that touch detections for the whole touch driving circuit can be achieved only by using touch driving signals with two frequencies. Thus, the driving way of the touch driving circuit is simple, number of signal lines is small, and touch detection is facilitated.

As shown in FIG. 2, the touch electrodes, i.e., touch electrodes TX(1) to TX(30) are arranged along the first direction Y. The shifting registers are arranged along the first direction Y. When 30 touch electrodes are driven, if a selection outputting circuit 24 is connected to two touch electrodes, 15 cascading shifting registers 21, i.e., the first shifting register to the fifteenth shifting register along the first direction Y, are needed; and 15 selection outputting circuits 24, i.e., the first selection outputting circuit to the fifteenth selection outputting circuit along the first direction Y, are needed.

In this embodiment, a selection outputting circuit 24 is connected to two adjacent electrodes in the first direction Y, and four touch electrodes corresponding to two adjacent shifting registers in the first direction Y are successively arranged in the first direction Y. For instance, the first selection outputting circuit is connected to touch electrodes TX1 and TX2, the second selection outputting circuit is connected to touch electrodes TX3 and TX4, the first shifting register is connected to the first selection outputting circuit and the second shifting register is connected to the second selection outputting circuit. In this embodiment, the selection outputting circuits are connected to the touch electrodes in sequence. This simple connection way of wiring facilitates layout of the circuit. During the scanning the shifting registers stage by stage along the first direction Y, the touch electrodes are scanned in sequence such that two touch electrodes are scanned simultaneously at a time. This is a simple way of touch driving.

Figure 3:
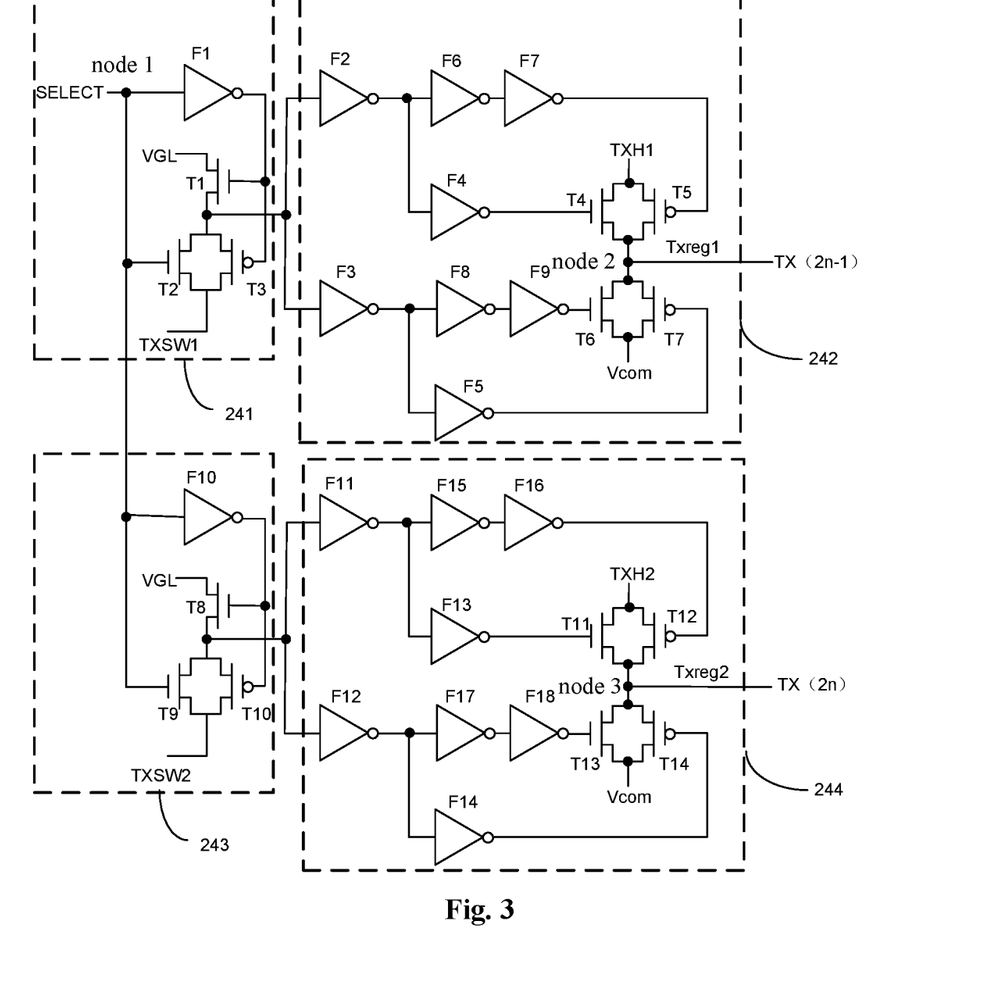
FIG. 3 is a structural diagram of a selection outputting circuit according to an embodiment of the disclosure.

The selection outputting circuit 24 according to another embodiment of the disclosure may have a structure shown in FIG. 3.

FIG. 3 is a structural diagram of a selection outputting circuit according to an embodiment of the disclosure. In this embodiment, the selection outputting circuit includes: a first gating unit 241 connected to the shifting register; a first output unit 242 connected to the first gating unit 241 and the first touch electrode TX(2n−1); a second gating unit 243 connected to the shifting register; and a second output unit 244 connected to the second gating unit 243 and the second touch electrode TX(2n).

As shown in FIG. 3, the shifting register connected to the selection outputting circuit can input a selecting signals SELECT into the selection outputting circuit.

A first signal TXSW1 and a third signal VGL are input into the first gating unit 241; and a second signal TXSW2 and the third signal VGL are input into the second gating unit 243. A first driving signal TXH1 and a common voltage Vcom are input into the first output unit 242; and a second signal TXH2 and the common voltage Vcom are input into the second output unit 244. The third signal VGL can be a low-level signal.

When the shifting register is being scanned, that is, the shifting register inputs a high-level selecting signal SELECT into the selection outputting circuit connected to the shifting register, the first gating unit 241 selects to output the first signal TXSW1 and the second gating unit 243 selects to output the second signal TXSW2. The first output unit 242 outputs the first driving signal TXH1 as the touch driving signal Txreg1 for the first touch electrode TX(2n−1) according to the first signal TXSW1; and the second output unit 244 outputs the second driving signal TXH2 as the touch driving signal Txreg2 for the second touch electrode TX(2n) according to the second signal TXSW2. In this embodiment, when the selecting signal SELECT is at high level, the first output unit 242 outputs the first signal TXH1 and the second output unit 244 outputs the second signal TXH2 to achieve touch driving of two touch electrodes simultaneously. In other embodiments, it may be set that the selecting signal SELECT is at low level, the first output unit 242 outputs the first signal TXH1 and the second output unit 244 outputs the second signal TXH2 to achieve touch driving of two touch electrodes simultaneously.

Figure 4:
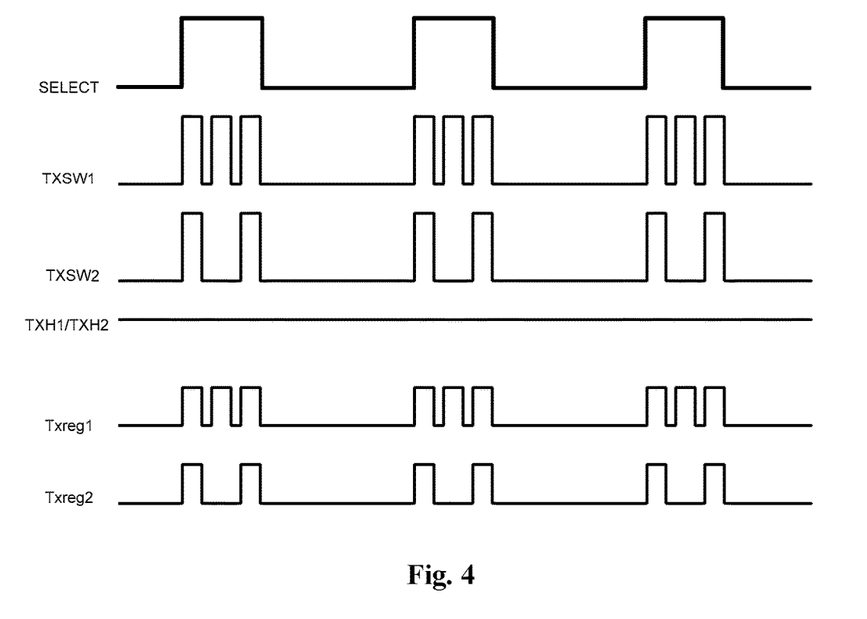
FIG. 4 is a sequence diagram of the selection outputting circuit shown in FIG. 3.

FIG. 4 is a sequence diagram of the selection outputting circuit shown in FIG. 3. During the periods of time that the selecting signal SELECT is at high level, to make the frequency of the touch driving signal Txreg1 input into the first touch electrode TX(2n−1) different from that of the touch signal Txreg2 input into the second touch electrode TX(2n), it is set that the first driving signal TXH1 and the second driving signal TXH2 are both at high level and the first signal TXSW1 and the second signal TXSW2 are pulse signals with different frequencies. The pulse signal includes a plurality of alternate high-level segments and low-level segments. The first output unit 242 outputs the first driving signal TXH1 as the touch driving signal while the first signal TXSW1 is at high level. And the second output unit 244 outputs the second driving signal TXH2 as the touch driving signal while the second signal TXSW2 is at high level. Since the frequency of the first signal TXSW1 is different from that of the second signal TXSW2, the frequency of the first driving signal TXH1 output by the first output unit 242 is different from that of the second driving signal TXH2 output by the second output unit 244, i.e., the frequency of the touch driving signal Txreg1 is different from that of the touch driving signal Txreg2, during the periods of time that the selecting signal SELECT is at high level.

It should be noted that in this embodiment, the high level is a direct voltage that can turn on an NMOS transistor and the low level is a direct voltage that can turn off the NMOS transistor.

When the shifting register is not scanned, i.e., the shifting register connected to the selection outputting circuit 24 outputs a low-level selecting signal SELECT to the selection outputting circuit 24, the first gating unit 241 and the second gating unit 243 both select to output the third signal VGL, and the first output unit 242 and the second output unit 244 both output the common voltage Vcom. In this way, the touch electrodes may be at low level in a case that the shifting register is not scanned, to facilitate touch detection in a next scan.

In the selection outputting circuit shown in FIG. 3, the first gating unit 241 can include a first switching transistor T1, a second switching transistor T2, a third switching transistor T3 and a first inverter F1. The control terminal of the first switching transistor T1 can be connected to the output terminal of the first inverter F1, the third signal VGL can input into the first electrode of the first switching transistor T1 and the second electrode of the first switching transistor T1 can be connected to the first electrode of the second switching transistor T2 and the first electrode of the third switching transistor T3. The control terminal of the second switching transistor T2 can be connected to a first node 1 and the first signal TXSW1 can be input into the second electrode of the second switching transistor T2, where the first node is connected to the shifting register so that the selecting signal SELECT is input into the first node. The control terminal of the third switching transistor T3 is connected to the output terminal of the first inverter F1 and the first signal TXSW1 can be input into the second electrode of the third switching transistor T3. The input terminal of the first inverter F1 can be connected to the first node 1.

In the selection outputting circuit shown in FIG. 3, the first output unit 242 can include a fourth switching transistor T4, a fifth switching transistor T5, a sixth switching transistor T6, a seventh switching transistor T7, a second inverter F2, a third inverter F3, a fourth inverter F4 and a fifth inverter F5.

The input terminal of the second inverter F2 can be connected to the second electrode of the first switching transistor T1, and the output terminal of the phase inverter F2 can be connected to the control terminal of the fifth switching transistor T5. The input terminal of the third inverter F3 can be connected to the second electrode of the first switching transistor T1, and the output terminal of the third inverter F3 can be connected to the control terminal of the sixth switching transistor T6. The input terminal of the fourth inverter F4 can be connected to the output terminal of the second inverter F2, and the output terminal of the fourth inverter F4 can be connected to the control terminal of the fourth switching transistor T4. The input terminal of the fifth inverter can be connected to the output terminal of the third inverter F3, and the output terminal of the fifth inverter F5 can be connected to the control terminal of the seventh switching transistor T7. The first driving signal TXH1 can be input into the first electrode of the fourth switching transistor T4 and the first electrode of the fifth switching transistor T5, and the second electrode of the fourth switching transistor T4 and the second electrode of the fifth switching transistor T5 can be connected to a second node 2, wherein the second node 2 can be connected to the first touch electrode TX(2n−

1) and the first touch driving signal Txreg1 can be input into the second node 2 or the first touch electrode TX (2n−1). The first electrode of the sixth switching transistor T6 and the first electrode of the seventh switching transistor T7 can be connected to the second node 2, and the common voltage Vcom can be input into the second electrode of the sixth switching transistor T6 and the second electrode of the seventh switching transistor T7.

In order to enhance the driving capability, the first output unit 242 can include a sixth inverter F6, a seventh inverter F7, an eighth inverter F8 and a ninth inverter F9.

The output terminal of the second inverter F2 can be connected to the control terminal of the fifth switching transistor T5 via the sixth inverter F6 and the seventh inverter F7 connected in series. Specifically, the input terminal of the sixth inverter F6 can be connected to the output terminal of the second inverter F2, the output terminal of the sixth inverter F6 can be connected to the input terminal of the seventh inverter F7, and the output terminal of the seventh inverter F7 can be connected to the control terminal of the fifth switching transistor T5.

The output terminal of the third inverter F3 can be connected to the control terminal of the sixth switching transistor T6 via the eighth inverter F8 and the ninth inverter F9 connected in series. Specifically, the input terminal of the eighth inverter F8 can be connected to the output terminal of the third inverter F3, the output terminal of the eighth inverter F8 can be connected to the input terminal of the ninth inverter F9, and the output terminal of the ninth inverter F9 can be connected to the control terminal of the sixth switching transistor T6.

In the selection outputting circuit shown in FIG. 3, the second gating unit 243 can include an eighth switching transistor T8, a ninth switching transistor T9, a tenth switching transistor T10 and a tenth inverter F10.

The control terminal of the eighth switching transistor T8 can be connected to the output terminal of the tenth inverter F10, the third signal VGL can be input into the first electrode of the eighth switching transistor T8, and the second electrode of the eighth switching transistor T8 can be connected to the first electrode of the ninth switching transistor T9 and the first electrode of the tenth switching transistor T10. The control terminal of the ninth switching transistor T9 can be connected to the first node 1, and the second signal TXSW2 can be input into the second electrode of the ninth switching transistor T9. The control terminal of the tenth switching transistor T10 can be connected to the output terminal of the inverter F10, and the second signal TXSW2 can be input into the second electrode of the tenth switching transistor T10. The input terminal of the tenth inverter T10 can be connected to the first node 1.

In the selection outputting circuit shown in FIG. 3, the second output unit 244 can include an eleventh switching transistor T11, a twelfth switching transistor T12, a thirteenth switching transistor T13, a fourteenth switching transistor T14, an eleventh inverter F11, a twelfth inverter F12, a thirteenth inverter F13 and a fourteenth inverter F14.

The input terminal of the eleventh inverter F11 can be connected to the second electrode of the eighth switching transistor T8, and the output terminal of eleventh inverter F11 can be connected to the control terminal of the twelfth switching transistor T12. The input terminal of the twelfth inverter F12 can be connected to the second electrode of the eighth switching transistor T8, and the output terminal of the twelfth switching transistor F12 can be connected to the control terminal of the thirteenth switching transistor T13. The input terminal of the thirteenth inverter F13 can be connected to the output terminal of the eleventh inverter F11, and the output terminal of the thirteenth switching transistor F13 can be connected to the control terminal of the eleventh switching transistor T11. The input terminal of the fourteenth inverter F14 can be connected to the output terminal of the twelfth inverter F12, and the output terminal of the fourteenth inverter F14 can be connected to the control terminal of the fourteenth switching transistor T14. The second driving signal TXH2 can be input into the first electrode of the eleventh switching transistor T11 and the first electrode of the twelfth switching transistor T12, and the second electrode of the eleventh switching transistor T11 and the second electrode of the twelfth switching transistor T12 can be connected to a third node 3, where the third node 3 can be connected to the second touch electrode TX(2n) so that the second touch driving signal Txreg2 can be input into second touch electrode via the third node 3. The first electrode of the thirteenth switching transistor T13 and the first electrode of the fourteenth switching transistor T14 can be connected to the third node 3, and the common voltage Vcom can be input into the second electrode of the thirteenth switching transistor T13 and the second electrode of the fourteenth switching transistor T14.

In order to enhance the driving capability, the second output unit 244 can further include a fifteenth inverter F15, a sixteenth inverter F16, a seventeenth inverter F17 and an eighteenth inverter F18.

The output terminal of the eleventh inverter F11 can be connected to the control terminal of the twelfth switching transistor T12 via the fifteenth inverter F15 and the sixteenth inverter F16 connected in series. Specifically, the input terminal of the fifteenth inverter F15 can be connected to the output terminal of the eleventh inverter F11, the output terminal of the fifteenth inverter F15 can be connected to the input terminal of the sixteenth inverter F16, and the output terminal of the sixteenth inverter F16 can be connected to the control terminal of the twelfth switching transistor T12.

The output terminal of the twelfth inverter F12 can be connected to the control terminal of the thirteenth switching transistor T13 via the seventeenth inverter F17 and the eighteenth inverter F18 connected in series. Specifically, the input terminal of the seventeenth inverter F17 can be connected to the output terminal of the twelfth inverter F12, the output terminal of the seventeenth inverter F17 can be connected to the input terminal of the eighteenth inverter F18, and the output terminal of the eighteenth inverter F18 can be connected to the control terminal of the thirteenth switching transistor T13.

The first switching transistor T1, the second switching transistor T2, the fourth switching transistor T4, the sixth switching transistor T6, the eighth switching transistor T8, the ninth switching transistor T9, the eleventh switching transistor T11 and the thirteenth switching transistor T13 can be all NMOS transistors. The third switching transistor T3, the fifth switching transistor T5, the seventh switching transistor T7, the tenth switching transistor T10, the twelfth switching transistor T12 and the fourteenth switching transistor T14 can be all PMOS transistors.

Figure 5:
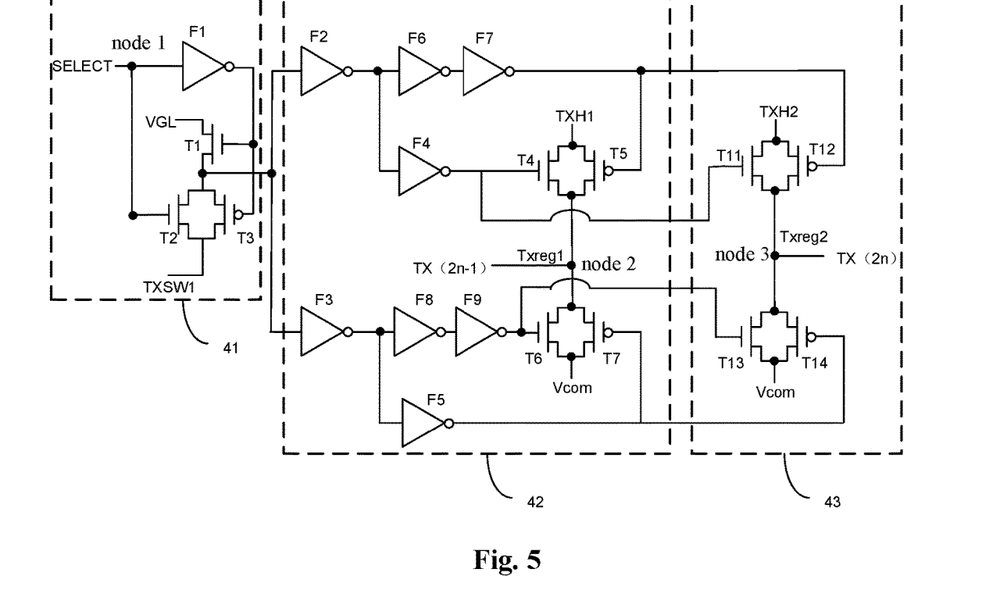
FIG. 5 is a structural diagram of a selection outputting circuit according to another embodiment of the disclosure.

The selection outputting circuit 24 according to the embodiment may alternatively have a structure as shown in FIG. 5.

FIG. 5 is a structural diagram of a selection outputting circuit according to another embodiment of the disclosure. In this embodiment, the selection outputting circuit includes: a gating unit 41 connected to the shifting register; a first output unit 42 connected to the gating unit 41 and the first touch electrode TX(2n−1); and a second output unit 43 connected to the gating unit 41 and the second touch electrode TX(2n).

In this embodiment, the first signal TXSW1 and the third signal VGL are input into the gating unit 41; the first driving signal TXH1 and the common voltage Vcom are input into the first output unit 42; and the second driving signal TXH2 and the common voltage Vcom are input into the second output unit 43.

In this embodiment, when the shifting register is being scanned, i.e., the shifting register connected to the selection outputting circuit inputs a high-level selecting signal SELECT into the selection outputting circuit, the gating unit 41 selects to output the first signal TXSW1; the first output unit 42 outputs the first driving signal TXH1 as the touch driving signal for the first touch electrode TX(2n−1) according to the first signal TXSW1; and the second output unit 43 outputs the second driving signal TXH2 as the touch signal for the second touch electrode TX(2n) according to the first signal TXSW1.

In this embodiment, when the shifting register is not scanned, i.e., the shifting register connected to the selection outputting circuit inputs a low-level selecting signal SELECT into the selection outputting circuit, the gating unit 41 selects to output the third signal VGL, the first output unit 42 and the second output unit 43 both output the common voltage Vcom according to the third signal VGL.

In the selection outputting circuit shown in FIG. 5, the gating unit 41 can have the same structure as the first gating unit 241 shown in FIG. 3. The gating unit 41 can include a first switching transistor T1, a second switching transistor T2, a third switching transistor T3 and a first inverter F1. The control terminal of the first switching transistor T1 can be connected to the output terminal of the first inverter F1, the third signal VGL can be input into the first electrode of the first switching transistor T1, and the second electrode of the first switching transistor T1 can be connected to the first electrode of the second switching transistor T2 and the first electrode of the third switching transistor T3. The control terminal of the second switching transistor T2 can be connected to a first node 1, and the first signal TXSW1 can be input into the second electrode of the second switching transistor T2, wherein the first node 1 can be connected to the shifting register so that the selecting signal SELECT is input into the first node 1. The control terminal of the third switching transistor T3 can be connected to the output terminal of the first inverter F1, the first signal TXSW1 can be input into the second electrode of third switching transistor T3, and the input terminal of the first inverter F1 can be connected to the first node 1.

In the selection outputting circuit shown in FIG. 5, the first output unit 42 has the same structure as the first output unit 242 shown in FIG. 3. The first output unit 42 includes a fourth switching transistor T4, a fifth switching transistor T5, a sixth switching transistor T6, a seventh switching transistor T7, a second inverter F2, a third inverter F3, a fourth inverter F4 and a fifth inverter F5.

In this embodiment, the input terminal of the second inverter F2 is connected to the second electrode of the first switching transistor T1, and the output terminal of second inverter F2 is connected to the control terminal of the fifth switching transistor T5. The input terminal of the third inverter F3 is connected to the second electrode of the first switching transistor T1, and the output terminal of the third inverter F3 is connected to the control terminal of the sixth switching transistor T6. The input terminal of the fourth inverter F4 is connected to the output terminal of the second inverter F2, and the output terminal of fourth inverter F4 is connected to the control terminal of the fourth switching transistor T4. The input terminal of the fifth inverter F5 is connected to the output terminal of the third inverter F3, and the output terminal of F5 is connected to the control terminal of the seventh switching transistor T7. The first driving signal TXH1 is input into the first electrode of the fourth switching transistor T4 and the first electrode of the fifth switching transistor T5, and the second electrode of the fourth switching transistor T4 and the second electrode of the fifth switching transistor T5 are connected to a second node 2, where the second node 2 is connected to the first touch electrode TX(2n−1), and the first touch driving signal Txreg1 is input into the first touch electrode TX(2n−1) via the second node 2. The first electrode of the sixth switching transistor T6 and the first electrode of the seventh switching transistor T7 are connected to the second node 2, and the common voltage Vcom is input into the second electrode of the sixth switching transistor T6 and the second electrode of the seventh switching transistor T7.

Similarly, for enhancing the driving capability, the first output unit 42 can include a sixth inverter F6, a seventh inverter F7, an eighth inverter F8 and a ninth inverter F9.

The output terminal of the second inverter F2 can be connected to the control terminal of the fifth switching transistor T5 via the sixth inverter F6 and the seventh inverter F7 connected in series. Specifically, the input terminal of the sixth inverter F6 can be connected to the output terminal of the second inverter F2, the output terminal of the sixth inverter F6 can be connected to the input terminal of the seventh inverter F7, and the output terminal of the seventh inverter T7 can be connected to the control terminal of the fifth switching transistor T5.

The output terminal of the third inverter F3 can be connected to the control terminal of the sixth switching transistor T6 via the eighth inverter F8 and the ninth inverter F9 connected in series. Specifically, the input terminal of the eighth inverter can be connected to the output terminal of the third inverter F3, the output terminal of the eighth inverter F8 is connected to the input terminal of the ninth inverter F9, and the output terminal of the ninth inverter F9 is connected to the control terminal of the sixth switching transistor T6.

In the selection outputting circuit shown in FIG. 5, the second output unit can include an eleventh switching transistor T11, a twelfth switching transistor T12, a thirteenth switching transistor T13 and a fourteenth switching transistor T14.

The control terminal of the eleventh switching transistor T11 can be connected to the control terminal of the fourth switching transistor T4, the second driving signal TXH2 can be input into the first electrode of the eleventh switching transistor T11, and the second electrode of the eleventh switching transistor T11 can be connected to a third node 3, where the third node 3 can be connected to the second touch electrode TX(2n). The control terminal of the twelfth switching transistor T12 can be connected to the control terminal of the fifth switching transistor T5, the second driving signal TXH2 can be input into the first electrode of the twelfth switching transistor T12, and the second electrode of the twelfth switching transistor T12 can be connected to the third node 3. The control terminal of the thirteenth switching transistor T13 can be connected to the control terminal of the sixth switching transistor T6, the first electrode of the thirteenth switching transistor T13 can be connected to the third node 3, and the common voltage Vcom can be input into the second electrode of the thirteenth switching transistor T13. The control terminal of the fourteenth switching transistor T14 can be connected to the control terminal of the sixth switching transistor T7, the first electrode of the fourteenth switching transistor T14 can be connected to the third node 3, and the common voltage Vcom can be input into the second electrode of the fourteenth switching transistor T14.

Compared with the selection outputting circuit shown in FIG. 3, in the selection outputting circuit shown in FIG. 5, a same gating unit is shared by the first output circuit and the second output circuit, and the inverters of the first output circuit is shared with the second output circuit, so that the second output unit is a gate circuit only consisted of four switching transistors, thereby greatly simplifying the structure of the circuit, and reducing the cost.

Figure 6:
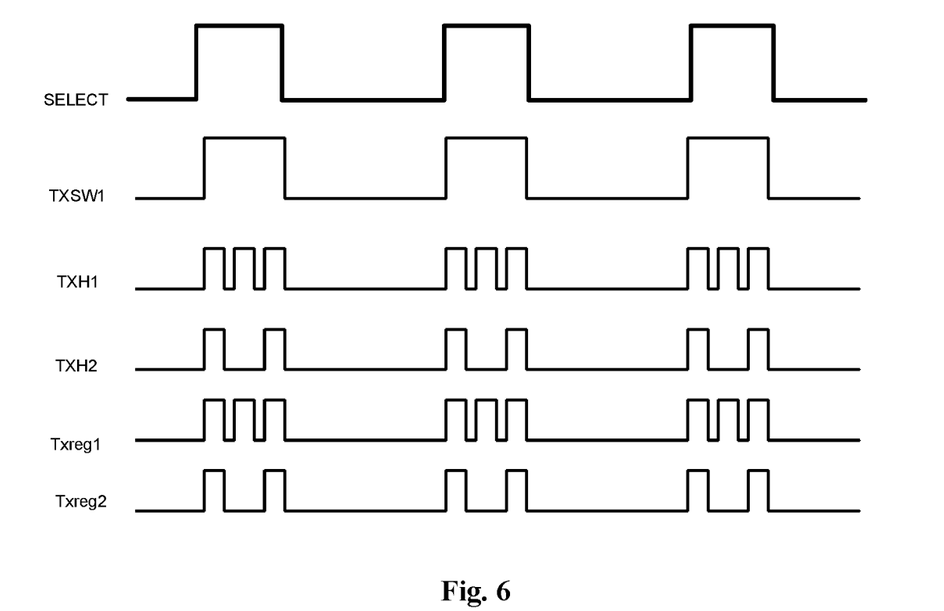
FIG. 6 is a sequence diagram of the selection outputting circuit shown in FIG. 5.

FIG. 6 is a sequence diagram of the selection outputting circuit shown in FIG. 5. During periods of time that the selecting signal SELECT is at high level, to make the frequency of the touch driving signal Txreg1 input into the first touch electrode TX(2n−1) different from that of the touch signal Txreg2 input into the second touch electrode TX(2n), the first signal TXSW1 may be set as a square signal the same as the selecting signal SELECT, and the first signal TXSW1 and the second signal TXSW2 may be set as pulse signals with different frequencies. During the periods of time that the selecting signal SELECT is at high level, the pulse frequency of the first driving signal TXH1 is different from that of the second driving signal TXH2, and during periods of time that the selecting signal SELECT is at low level, the first driving signal TXH1 and the second driving signal TXH2 are both at low level.

During the periods of the time that the selecting signal SELECT is at high level, since the first signal TXSW1 is at high level, the gating unit 41 outputs a high-level first signal TXSW1, and the high-level first signal TXSW1 makes the gate circuit (a circuit structure consisted of the fourth switching transistor T4, the fifth switching transistor T5, the sixth switching transistor T6 and the seventh switching transistor T7) of the first output circuit 42 output the first driving signal TXH1 as the touch driving signal Txreg1 input into the first touch electrode TX(2n−1), and makes the second output circuit 43 output the second driving signal TXH2 as the touch driving signal Txreg2 input into the second touch electrode TX(2n). Since the first driving signal TXH1 and the second driving signal TXH2 are pulse signals with different frequencies, the frequency of the touch driving signal Txreg1 input into the first touch electrode TX(2n−1) is different from that of the touch driving signal Txreg2 input into the second touch electrode TX(2n).

In the selection outputting circuit shown in FIG. 5, the first switching transistor T1, the second switching transistor T2, the fourth switching transistor T4, the sixth switching transistor T6, the eleventh switching transistor T11 and the thirteenth switching transistor T13 can all be NMOS transistors. The third switching transistor T3, the fifth switching transistor T5, the seventh switching transistor T7, the twelfth switching transistor T12 and the fourteenth switching transistor T14 can all be PMOS transistors.

In above embodiments, the case that each selection outputting circuit is connected to two touch electrodes is taken as an example for illustration. In other embodiments, each selection outputting circuit may be connected to three touch electrodes, and the selection outputting circuit provides driving signals for the three touch electrodes simultaneously, and driving signals for three touch electrodes connected to a same selection outputting circuit have different frequencies. In this way, when the shifting register in each stage is being scanned, touch detection may be performed on three touch electrodes simultaneously.

When each selection outputting circuit is connected to three touch electrodes, the selection outputting circuit can be implemented in two ways. In the first way, a third gating unit and a third output circuit are added to the selection outputting circuit shown in FIG. 3, where the third gating unit may have a same structure as the first gating unit or the second gating unit shown in FIG. 3, and the third output circuit may have a same structure as the first output circuit or the second output circuit shown in FIG. 3. In the second way, the third output unit is added to the selection outputting circuit shown in FIG. 5, where the third output unit may have a same structure as the second output unit shown in FIG. 5.

According to the descriptions above, the touch driving circuit in the embodiments of the disclosure can drive touch electrodes connected to the shifting register being scanned currently to perform touch detections simultaneously in each scan, in a case that the shifting registers are being scanned stage by stage, thus improving the efficiency of touch detection. Furthermore, the number of stages for the shifting registers and the selection outputting circuits is reduced, circuit structure is simplified, narrow frame can be achieved and cost is reduced.

Figure 7:
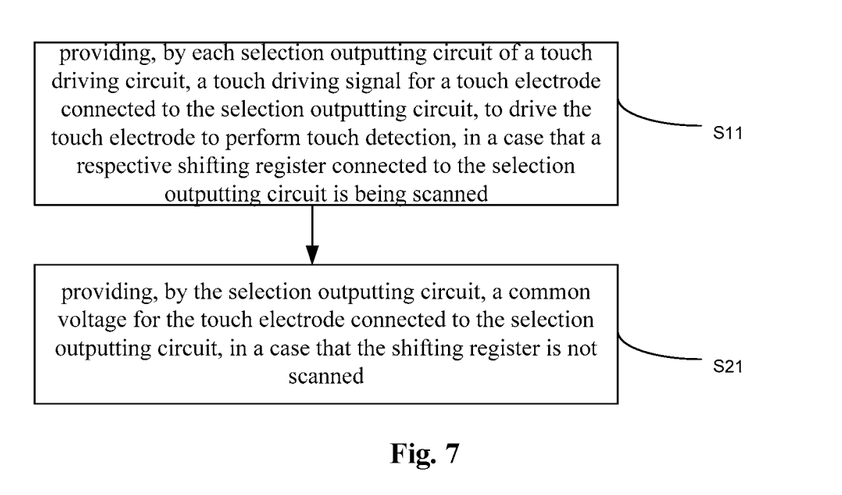
FIG. 7 is a flowchart of a touch driving method according to an embodiment of the disclosure.

Based on the above embodiments of the touch driving circuit, a touch driving method is provided according to an embodiment of the disclosure. The method can use an embodiment of touch driving circuit described above. FIG. 7 is a flowchart of a touch driving method according to an embodiment of the disclosure, and the method includes the following steps S11.

Step S11 includes: providing, by each selection outputting circuit of a touch driving circuit, a touch driving signals to a touch electrode connected to the selection outputting circuit, to drive the touch electrode to perform touch detection, when a respective shifting register connected to the selection outputting circuit is being scanned.

At least one selection outputting circuit is connected to multiple touch electrodes, and provides touch driving signals with different frequencies for the multiple touch electrodes.

Specifically, each selection outputting circuit may be set to simultaneously drive two touch electrodes to perform touch detections.

Optionally, the touch driving method further includes step S12.

Step S12 includes: providing, by the selection outputting circuit, a common voltage for the touch electrode connected to the selection outputting circuit, in a case that the shifting register is not scanned.

The common voltage is also used as a sustaining voltage for the touch drive electrodes in a case that touch detection is not performed on the touch electrodes, to facilitate touch detections in a next scan and to reduce the amount of signal data.

In the touch driving method according to an embodiment, when shifting registers are scanned stage by stage, touch driving signals with different frequencies are provide for multiple touch electrodes simultaneously, thereby achieving touch detections on multiple touch electrodes simultaneously.

A touch screen is further provided according to an embodiment of the disclosure, which includes the touch circuit according to the embodiment and/or uses the touch driving method according to the embodiment. The touch screen can simultaneously drive multiple touch electrodes to perform touch detections, thus the efficiency of touch driving is high.

The description of the embodiments disclosed herein enables those skilled in the art to implement or use the present disclosure. Numerous modifications to the embodiments are apparent to those skilled in the art, and the general principle herein can be implemented in other embodiments without deviation from the spirit or scope of the present disclosure. Therefore, the present disclosure is not limited to the embodiments described herein, but in accordance with the widest scope consistent with the principle and novel features disclosed herein.

The invention claimed is:

1. A touch driving circuit comprising: a plurality of cascading shifting registers; and selection outputting circuits each connected to a respective shifting register of the plurality of cascading shifting registers, wherein, at least one of the selection outputting circuits is connected with a plurality of touch electrodes;

wherein in a case that the respective shifting register of the plurality of cascading shifting registers is being scanned and one of the at least one of the selection outputting circuits is connected to the respective shifting register of the plurality of cascading shifting registers, the one of the at least one of the selection outputting circuits simultaneously provides touch driving signals with different frequencies for the plurality of touch electrodes connected to the one of the at least one of the selection outputting circuit; and wherein in a case that the respective shifting register of the plurality of cascading shifting registers is not scanned, the one of the at least one of the selection outputting circuits provides a common voltage for the plurality of touch electrodes connected with the each of the at least one of the selection outputting circuits;

wherein each of the at least one of the selection outputting circuits is connected with a first touch electrode of the plurality of touch electrodes and a second touch electrode of the plurality of touch electrodes, and the frequency of the touch driving signal of the first touch electrode is different from that of the touch driving signal of the second touch electrode;

wherein the one of the at least one of the selection outputting circuits comprises a first gating unit connected with the respective shift register of the plurality of cascading shifting registers, a first output unit connected with the first gating unit and the first touch electrode, a second gating unit connected with the respective shifting register of the plurality of cascading shifting registers, and a second output unit connected with the second gating unit and the second touch electrode;

wherein a first signal and a third signal are input into the first gating unit; and a second signal and the third signal are input into the second gating unit; wherein a first driving signal and a common voltage are input into the first output unit; and wherein a second driving signal and the common voltage are input into the second output unit;

wherein in a case that the respective shifting register of the plurality of cascading shifting registers is being scanned, the first gating unit selects to output the first signal and the second gating unit selects to output the second signal, the first output unit outputs the first driving signal as the touch driving signal for the first touch electrode according to the first signal, and the second output unit outputs the second driving signal as the touch driving signal for the second touch electrode according to the second signal; wherein in a case that the respective shifting register of the plurality of cascading shifting registers is not scanned, the first gating unit and the second gating unit both output the third signal, and the first output unit and the second output unit both output the common voltage according to the third signal.

2. The touch driving circuit according to claim 1, wherein the plurality of touch electrodes are arranged along a first direction, and the plurality of cascading shifting registers are arranged along the first direction; wherein each of the selection outputting circuits is connected with two adjacent ones of the plurality of touch electrodes in the first direction; and four of the plurality of touch electrodes corresponding to two adjacent ones of the plurality of cascading shifting registers are successively arranged in the first direction.

3. The touch driving circuit according to claim 1, wherein the first gating unit comprises a first switching transistor, a second switching transistor, a third switching transistor and a first inverter; wherein a control terminal of the first switching transistor is connected with an output terminal of the first inverter, the third signal is input into a first electrode of the first switching transistor, and a second electrode of the first switching transistor is connected with a first electrode of the third switching transistor; wherein a control terminal of the second switching transistor is connected to a first node, the first signal is input into a second electrode of the second switching transistor, and the first node is connected with the shifting register; wherein a control terminal of the third switching transistor is connected with the output terminal of the first inverter, and the first signal is input into a second electrode of the third switching transistor; and wherein an input terminal of the first inverter is connected with the first node.

4. The touch driving circuit according to claim 1, wherein the first output unit comprises a fourth switching transistor, a fifth switching transistor, a sixth switching transistor, a seventh switching transistor, a second inverter, a third inverter, a fourth inverter and a fifth inverter; wherein an input terminal of the second inverter is connected with a second electrode of the first switching transistor, and an output terminal of the second inverter is connected with a control terminal of the fifth switching transistor; wherein an input terminal of the third inverter is connected with the second electrode of the first switching transistor, and an output terminal of the third inverter is connected with a control terminal of the sixth switching transistor; wherein an input terminal of the fourth inverter is connected with the output terminal of the second inverter, and an output terminal of the fourth inverter is connected with a control terminal of the fourth switching transistor; wherein an input terminal of the fifth inverter is connected with the output terminal of the third inverter, and the output terminal of the fifth inverter is connected with a control terminal of the seventh switching transistor; wherein the first driving signal is input into a first electrode of the fourth switching transistor and a first electrode of the fifth switching transistor, and a second electrode of the fourth switching transistor and a second electrode of the fifth switching transistor are connected to a second node, wherein the second node is connected with the first touch electrode; and wherein a first electrode of the sixth switching transistor and a first electrode of the seventh switching transistor are connected with the second node, and the common voltage is input into a second electrode of the sixth switching transistor and a second electrode of the seventh switching transistor.

5. The touch driving circuit according to claim 4, wherein the first output unit further comprises a sixth inverter, a seventh inverter, an eighth inverter and a ninth inverter; wherein
the output terminal of the second inverter is connected with the control terminal of the fifth switching transistor via the sixth inverter and the seventh inverter connected in series; and
the output terminal of the third inverter is connected with the control terminal of the sixth switching transistor via the eighth inverter and the ninth inverter connected in series.

6. The touch driving circuit according to claim 1, wherein the second gating unit comprises an eighth switching transistor, a ninth switching transistor, a tenth switching transistor and a tenth inverter; wherein a control terminal of the eighth switching transistor is connected with an output terminal of the tenth inverter, the third signal is input into a first electrode of the eighth switching transistor, and a second electrode of the eighth switching transistor is connected with a first electrode of the ninth switching transistor and a first electrode of the tenth switching transistor; wherein a control terminal of the ninth switching transistor is connected with a first node, and the second signal is input into a second electrode of the ninth switching transistor, wherein the first node is connected with the respective shifting register of the plurality of cascading shifting registers; wherein a control terminal of the tenth switching transistor is connected with the output terminal of the tenth inverter, and the second signal is input into a second electrode of the tenth switching transistor; and wherein an input terminal of the tenth inverter is connected with the first node.

7. The touch driving circuit according to claim 6, wherein the second output unit comprises an eleventh switching transistor, a twelfth switching transistor, a thirteenth switching transistor, a fourteenth switching transistor, an eleventh inverter, a twelfth inverter, a thirteenth inverter and a fourteenth inverter; wherein an input terminal of the eleventh inverter is connected with the second electrode of the eighth switching transistor, and an output terminal of the eleventh inverter is connected with a control terminal of the twelfth switching transistor; wherein an input terminal of the twelfth inverter is connected with the second electrode of the eighth switching transistor, and an output terminal of the twelfth inverter is connected with a control terminal of the thirteenth switching transistor; wherein an input terminal of the thirteenth inverter is connected with an output terminal of the eleventh inverter, and an output terminal of the thirteenth inverter is connected with a control terminal of the eleventh switching transistor; wherein an input terminal of the fourteenth inverter is connected with the output terminal of the twelfth inverter, and an output terminal of the fourteenth inverter is connected with a control terminal of the fourteenth switching transistor; wherein the second driving signal is input into a first electrode of the eleventh switching transistor and a first electrode of the twelfth switching transistor, and a second electrode of the eleventh switching transistor and a second electrode of the twelfth switching transistor are connected to a third node, wherein the third node is connected with the second touch electrode; and wherein a first electrode of the thirteenth switching transistor and a first electrode of the fourteenth switching transistor are connected with the third node, and the common voltage is input into a second electrode of the thirteenth switching transistor and a second electrode of the fourteenth switching transistor.

8. The touch driving circuit according to claim 7, wherein the second output unit further comprises a fifteenth inverter, a sixteenth inverter, a seventeenth inverter and an eighteenth inverter; wherein
the output terminal of the eleventh inverter is connected with the control terminal of the twelfth switching transistor via the fifteenth inverter and the sixteenth inverter connected in series; and
the output terminal of the twelfth inverter is connected with the control terminal of the thirteenth switching transistor via the seventeenth switching transistor and the eighteenth switching transistor connected in series.

9. The touch driving circuit according to claim 1, wherein each of the selection outputting circuits is connected with three ones of the plurality of touch electrodes, and the each of the selection outputting circuits provides touch driving signals with different frequencies for the three ones of the plurality of touch electrodes connected to the each of the selection outputting circuits simultaneously.

10. A touch driving circuit, comprising: a plurality of cascading shifting registers; and selection outputting circuits each connected to a respective shifting register of the plurality of cascading shifting registers,
wherein, at least one of the selection outputting circuits is connected with a plurality of touch electrodes;
wherein in a case that the respective shifting register of the plurality of cascading shifting registers is being scanned and one of the at least one of the selection outputting circuits is connected to the respective shifting register of the Plurality of cascading shifting registers, the one of the at least one of the selection outputting circuits simultaneously provides touch driving signals with different frequencies for the plurality of touch electrodes connected to the one of the at least one of the selection outputting circuit; and
wherein in a case that the respective shifting register of the plurality of cascading shifting registers is not scanned, the one of the at least one of the selection outputting circuits provides a common voltage for the plurality of touch electrodes connected with the each of the at least one of the selection outputting circuits;
wherein each of the at least one of the selection outputting circuits is connected with a first touch electrode and a second touch electrode, and the frequency of the touch driving signal of the first touch electrode is different from that of the touch driving signal of the second touch electrode;
wherein the one of the at least one of the selection outputting circuits comprises a gating unit connected with the respective shifting register of the plurality of cascading shifting registers, a first output unit connected with the gating unit and the first touch electrode, and a second output unit connected with the first output unit and the second touch electrode;
wherein a first signal and a third signal are input into the gating unit, a first driving signal and the common voltage are input into the first output unit, and a second driving signal and the common voltage are input into the second output unit;
wherein in a case that the respective shifting register of the plurality of cascading shifting registers is being scanned, the gating unit selects to output the first signal, the first output unit outputs the first driving signal as the touch driving signal for the first touch electrode according to the first signal, and the second output unit outputs the second driving signal as the drive signal for the second touch electrode according to the first signal; and wherein in a case that the respective shifting register of the plurality of cascading shifting registers is not scanned, the gating unit outputs the third signal, and the first output unit and the second output unit output the common voltage according to the third signal.

11. The touch driving circuit according to claim 10, wherein the gating unit comprises a first switching transistor, a second switching transistor, a third switching transistor and a first inverter; wherein a control terminal of the first switching transistor is connected with an output terminal of the first inverter, the third signal is input into a first electrode of the first switching transistor, and a second electrode of the first switching transistor is connected with a first electrode of the second switching transistor and a first electrode of the third switching transistor; wherein a control terminal of the second switching transistor is connected with a first node, and the first signal is input into a second electrode of the second switching transistor, wherein the first node is connected with the respective shifting register of the plurality of cascading shifting registers; wherein a control terminal of the third switching transistor is connected with the output terminal of the first inverter, and the first signal is input into a second electrode of the third switching transistor; and a input terminal of the first inverter is connected with the first node.

12. The touch driving circuit according to claim 10, wherein the first output unit comprises a fourth switching transistor, a fifth switching transistor, a sixth switching transistor, a seventh switching transistor, a second inverter, a third inverter, a fourth inverter and a fifth inverter; wherein an input terminal of the second inverter is connected with a second electrode of the first switching transistor, and an output terminal of the second inverter is connected with a control terminal of the fifth switching transistor; wherein an input terminal of the third inverter is connected with the second electrode of the first switching transistor, and an output terminal of the third inverter is connected with a control terminal of the sixth switching transistor; wherein an input terminal of the fourth inverter is connected with the output terminal of the second inverter, and an output terminal of the fourth inverter is connected with a control terminal of the fourth switching transistor; wherein an input terminal of the fifth inverter is connected with the output terminal of the third inverter, and the output terminal of the fifth inverter is connected with a control terminal of the seventh switching transistor; wherein the first driving signal is input into a first electrode of the fourth switching transistor and a first electrode of the fifth switching transistor, and a second electrode of the fourth switching transistor and a second electrode of the fifth switching transistor are connected with a second node, wherein the second node is connected with the first touch electrode; and wherein a first electrode of the sixth switching transistor and a first electrode of the seventh switching transistor are connected with the second node, and the common voltage is input into a second electrode of sixth switching transistor and a second electrode of the seventh switching transistor.

13. The touch driving circuit according to claim 12, wherein the first output unit further comprises a sixth inverter, a seventh inverter, an eighth inverter and a ninth inverter; wherein the output terminal of the second inverter is connected with the control terminal of the fifth switching transistor via the fifteenth inverter and the seventh inverter connected in series; and the output terminal of the third inverter is connected with the control terminal of the sixth switching transistor via the eighth inverter and the ninth inverter connected in series.

14. The touch driving circuit according to claim 12, wherein the second output unit further comprises an eleventh switching transistor, a twelfth switching transistor, a thirteenth switching transistor and a fourteenth switching transistor; wherein a control terminal of the eleventh switching transistor is connected with the control terminal of the fourth switching transistor, the second driving signal is input into a first electrode of the eleventh switching transistor, and a second electrode of the eleventh switching transistor is connected with a third node, wherein the third node is connected with the second touch electrode; wherein a control terminal of the twelfth switching transistor is connected with the control terminal of the fifth switching transistor, the second driving signal is input into a first electrode of the twelfth switching transistor, and a second electrode of the twelfth switching transistor is connected with the third node; wherein a control terminal of the thirteenth switching transistor is connected with the control terminal of the sixth switching transistor, a first electrode of the thirteenth switching transistor is connected with the third node, and the common voltage is input into a second electrode of the thirteenth switching transistor; and wherein a control terminal of the fourteenth switching transistor is connected with the control terminal of the seventh switching transistor, a first electrode of the fourteenth switching transistor is connected with the third node, and the common voltage is input into a second electrode of the fourteenth switching transistor.

15. The touch driving circuit according to claim 10, wherein the plurality of touch electrodes are arranged along a first direction, and wherein the plurality of shifting registers are arranged in a cascading pattern along the first direction; wherein each of the selection outputting circuits is connected with two adjacent ones of the plurality of touch electrodes in the first direction; and four of the plurality of touch electrodes corresponding to two adjacent ones of the plurality of shifting registers are successively arranged in the first direction.

16. The touch driving circuit according to claim 10, wherein each of the selection outputting circuit is connected with three ones of the plurality of touch electrodes, and the each of the selection outputting circuits provides touch driving signals with different frequencies for the three ones of the plurality of touch electrodes connected to the each of the selection outputting circuits simultaneously.

17. A touch driving method, comprising: providing, by each selection outputting circuit of a plurality of selection outputting circuits of a touch driving circuit, a touch driving signal for a touch electrode connected to each of the selection outputting circuit, to drive the touch electrode to perform touch detection, in a case that a respective shifting register of a plurality of shift registers connected to each of the selection outputting circuit is being scanned, wherein at least one selection outputting circuit of the plurality of selection outputting circuits is connected with a plurality of touch electrodes, provides touch driving signals with different frequencies for the plurality of touch electrodes, wherein each of the at least one of the selection outputting circuit is connected with a first electrode and a second electrode, and the frequency of the touch driving signal of the first touch electrode is different from that of the touch driving signal of the second electrode; and wherein;

each of the at least one of the selection outputting circuit comprises a first gating unit connected with the respective shift register of the of plurality of shifting registers, a first output unit connected with the first gating unit and the first touch electrode, a second gating unit connected with the respective shifting register of the plurality of shift registers, and a second output unit connected with the second gating unit and the second touch electrode; a first signal and a third signal are input into the first gating unit; and a second signal and the third signal are input into the second gating unit; wherein a first driving signal and a common voltage are input into the first output unit; and wherein a second driving signal and the common voltage are input into the second output unit;

in a case that the respective shifting register of the plurality of shift registers is being scanned, the first gating unit selects to output the first signal and the second gating unit selects to output the second signal, the first output unit outputs the first driving signal as the touch driving signal for the first touch electrode according to the first signal, and the second output unit outputs the second driving signal as the touch driving signal for the second touch electrode according to the second signal; and in a case that the respective shifting register of the plurality of shift registers is not scanned, the first gating unit and the second gating unit both output the third signal, and the first output unit and the second output unit both output the common voltage according to the third signal; or each of the at least one of the selection outputting circuit comprises a gating unit connected with the respective shift register of the of plurality of shifting registers, a first output unit connected with the gating unit and the first touch electrode, and a second output unit connected with the first output unit and the second touch electrode; a first signal and a third signal are input into the gating unit, a first driving signal and the common voltage are input into the first output unit, and a second driving signal and the common voltage are input into the second output unit;

in a case that the respective shifting register of the plurality of shift registers is being scanned, the gating unit selects to output the first signal, the first output unit outputs the first driving signal as the touch driving signal for the first touch electrode according to the first signal, and the second output unit outputs the second driving signal as the drive signal for the second touch electrode according to the first signal; and in a case that the respective shifting register of the plurality of shift registers is not scanned, the gating unit outputs the third signal, and the first output unit and the second output unit output the common voltage according to the third signal.

18. The touch driving method according to claim 17, further comprising: providing, by the selection outputting circuit, a common voltage for the touch electrode connected to the selection outputting circuit, in a case that the respective shifting register of the plurality of shift registers is not scanned.

* * * * *